(12) United States Patent
Rottinghaus

(10) Patent No.: US 7,752,829 B1
(45) Date of Patent: Jul. 13, 2010

(54) AUGER STRIPPER ARRANGEMENT FOR CORN HEAD

(75) Inventor: Robert Rottinghaus, Jesup, IA (US)

(73) Assignee: Clever Tech Inc., Jesup, IA (US)

( * ) Notice: Subject to any disclaimer, the term of this patent is extended or adjusted under 35 U.S.C. 154(b) by 0 days.

(21) Appl. No.: 12/544,922

(22) Filed: Aug. 20, 2009

(51) Int. Cl.
 *A01D 45/02* (2006.01)
(52) U.S. Cl. .................................... 56/110; 56/62
(58) Field of Classification Search ............ 56/110, 56/62, 60, 14.2, 119, 64, 14.5, 98, 99
See application file for complete search history.

(56) References Cited

U.S. PATENT DOCUMENTS

| | | | | |
|---|---|---|---|---|
| 2,180,594 | A * | 11/1939 | Kuhlman | 460/27 |
| 2,503,128 | A * | 4/1950 | Neighbour et al. | 56/50 |
| 2,604,750 | A | 7/1952 | Fergason | |
| 2,651,163 | A * | 9/1953 | Aasland | 56/107 |
| 2,821,058 | A * | 1/1958 | Jones | 56/108 |
| 3,139,887 | A * | 7/1964 | Karlsson et al. | 460/31 |
| 3,462,928 | A * | 8/1969 | Schreiner et al. | 56/104 |
| 4,233,804 | A * | 11/1980 | Fischer et al. | 56/104 |
| 4,377,062 | A * | 3/1983 | Slattery | 56/14.3 |
| 4,845,930 | A | 7/1989 | Dow | |
| 4,974,402 | A * | 12/1990 | Ostrup et al. | 56/102 |
| 5,009,061 | A * | 4/1991 | Heuling | 56/104 |
| 5,060,464 | A * | 10/1991 | Caron | 56/62 |
| 5,161,356 | A * | 11/1992 | Pick | 56/60 |
| 5,282,352 | A * | 2/1994 | Schoolman | 56/62 |
| 5,404,699 | A * | 4/1995 | Christensen et al. | 56/104 |
| 5,680,750 | A * | 10/1997 | Stefl | 56/62 |
| 5,787,696 | A * | 8/1998 | Wiegert et al. | 56/104 |
| 5,913,803 | A * | 6/1999 | Moster | 56/95 |
| 6,050,071 | A * | 4/2000 | Bich et al. | 56/52 |
| 6,216,428 | B1 * | 4/2001 | Becker et al. | 56/104 |
| 6,237,312 | B1 * | 5/2001 | Becker | 56/62 |
| 7,062,896 | B2 * | 6/2006 | Resing et al. | 56/64 |
| 7,073,316 | B2 * | 7/2006 | Resing et al. | 56/119 |
| 7,237,373 | B2 * | 7/2007 | Resing et al. | 56/104 |
| 7,373,767 | B2 * | 5/2008 | Calmer | 56/95 |
| 7,395,649 | B2 * | 7/2008 | Wubbels et al. | 56/52 |
| 7,493,745 | B2 * | 2/2009 | Wubbles et al. | 56/14.3 |
| 7,520,117 | B2 | 4/2009 | Rieck et al. | |

(Continued)

FOREIGN PATENT DOCUMENTS

SU 884609 B * 12/1981

*Primary Examiner*—Árpád Fábián-Kovács
(74) *Attorney, Agent, or Firm*—Wildman, Harrold, Allen & Dixon LLP

(57) ABSTRACT

A corn head includes plural pairs of first and second laterally spaced rotating stalk rolls each having outer fluting and plural outer arrays of spaced knife members extending along the length of each stalk roll. Corn stalks are directed by rotating pick-up cones each disposed forward of a respective stalk roll into the space between adjacent stalk rolls, where the stalks are directed downwardly through the inter-roll space and are reduced by the cutting action of the rotating knives. Each pick-up cone and its associated stalk roll rotate in opposite directions as do the two stalk rolls. Disposed above and extending along the length of the stalk rolls are a closely spaced upper auger and stripper plate which remove an ear of corn from the stalk and direct the ear to the combine for further processing. A skid plate is disposed adjacent a lower, forward portion of each pick-up cone.

23 Claims, 8 Drawing Sheets

U.S. PATENT DOCUMENTS

| | | | |
|---|---|---|---|
| 2002/0014064 A1* | 2/2002 | Wubbels et al. | 56/95 |
| 2003/0079458 A1* | 5/2003 | Wubbels et al. | 56/52 |
| 2003/0079459 A1* | 5/2003 | Bongert et al. | 56/104 |
| 2004/0016219 A1* | 1/2004 | Calmer | 56/51 |
| 2004/0107685 A1* | 6/2004 | Resing et al. | 56/119 |
| 2004/0123577 A1 | 7/2004 | Resing et al. | |
| 2005/0120695 A1* | 6/2005 | Calmer | 56/51 |
| 2007/0180806 A1* | 8/2007 | Calmer | 56/59 |
| 2007/0266689 A1* | 11/2007 | Calmer | 56/62 |
| 2010/0043371 A1* | 2/2010 | Rieck et al. | 56/14.7 |

* cited by examiner

FIG. 5
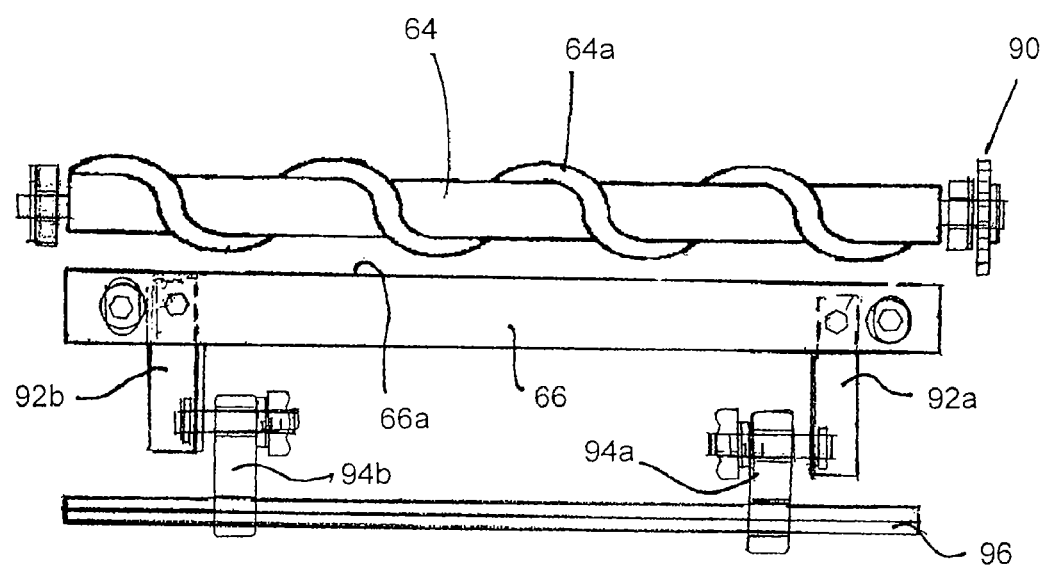
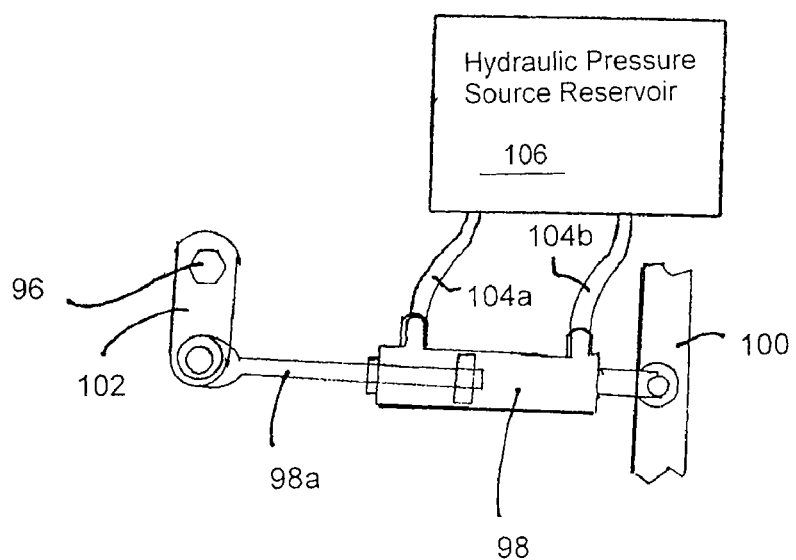
FIG. 5a

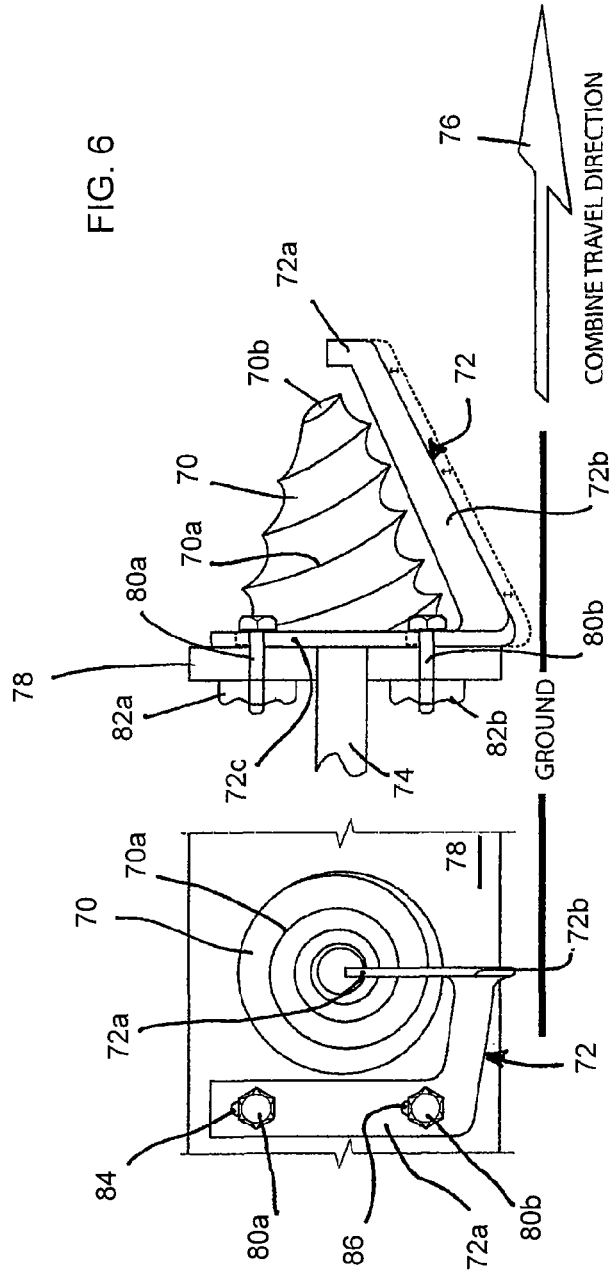
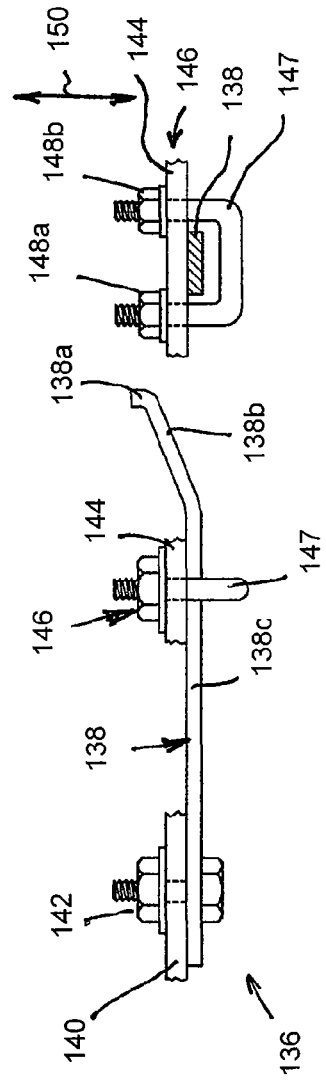

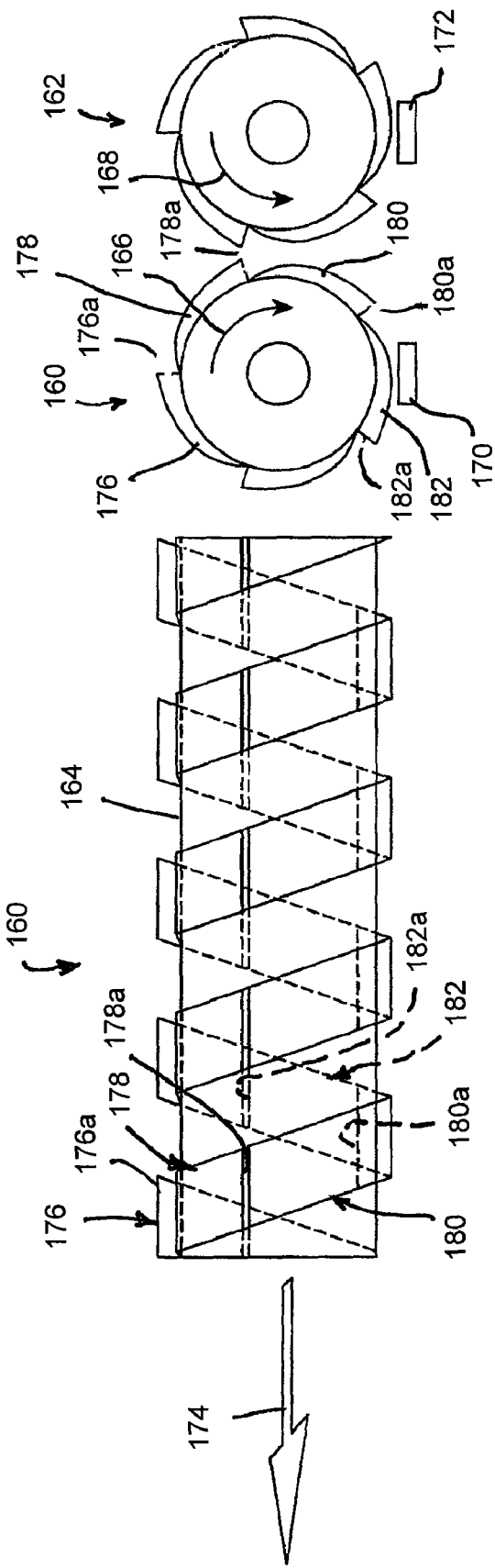

AUGER STRIPPER ARRANGEMENT FOR CORN HEAD

FIELD OF THE INVENTION

This invention relates generally to the harvesting of agricultural crops, and is particularly directed to a corn head as used with a combine in the harvesting of corn.

BACKGROUND OF THE INVENTION

Corn is generally harvested using a corn head 10 as shown in the perspective view of FIG. 1. The corn head 10 is attached to a forward, or leading, end of a combine (not shown in the figure for simplicity) which receives and processes the ears of corn from the corn head. A typical corn head as shown for the cord head 10 in FIG. 1 includes a left end 12 and a right end 14 with plural spaced row units 30 disposed therebetween. Row dividers 16 are displaced through a field such that the individual rows of corn are directed into the gaps 18 between adjacent row dividers which retrieve, lift and direct the rows of corn stalks toward a respective one of the row units 30. Each row unit 30 typically includes the combination of a gathering chain 20 and stripper plates (not shown in FIG. 1 for simplicity) which raise and direct the crop into the ear separation and conveying chamber of an individual row units 30. The stripper plates center the corn plant between a pair of rotating, fluted stalk rolls for discharge onto the soil. The combination of the rotating stalk rolls and stripper plates separate the ears of corn from the remainder of the corn plant as the plant is directed downwardly between the stripper plates and rotating stalk rolls for discharge onto the soil. The thus separated ears of corn are then conveyed rearwardly by means of the gathering chains 20 toward and into a trough 22 disposed generally transverse to the direction of travel of the combine and containing a rotating auger 24. Trough 22 is partially defined by a rear wall 26 having an opening 28 therein. Auger 24 includes first and second flute sections 24a and 24b which are configured so as to direct ears of corn deposited in trough 22 toward opening 28 in the rear wall 26 of the trough so as to discharge the ears of corn rearwardly in the combine for further processing.

The prior art corn head 10 shown in FIG. 1 suffers form several limitations. For example, the rotating gathering chains 20 which displace the separated ears of corn rearwardly tend to break due to excessive loading and foreign objects such as rocks and roots ingested by the corn head 10. Pieces of the broken gathering chains 12 tend to continue on a rearward path in the corn head 10 under the influence of the rotating stalk rolls and enter the combine causing damage or destruction to various combine components and resulting in operational failure. The rotating stalk roll is also subject to plugging, or stalling, when dense weeds or wet stalks are ingested. Any of the aforementioned interruptions in operation results in reduced productivity.

The present invention is intended to overcome the aforementioned limitations of the prior art by providing a corn head which operates without rotating gathering chains and affords protection from impact damage to, and eliminates clogging of, the pick-up cones in the leading stage, or crop ingestion portion, of the corn head.

OBJECTS AND SUMMARY OF THE INVENTION

Accordingly, it is an object of the present invention to eliminate the use of vegetation-gathering chains in a corn head incorporated in a combine.

It is another object of the present invention to facilitate the processing of corn stalks in a corn head including the separation and recovery of the ear of corn and the reduction and discharge of the corn stalk.

A further objection of the present invention is to separate an ear of corn from a corn stalk by means of a combine corn head during harvesting in a reliable, efficient and effective manner without the use of vegetation-gathering chains in the corn head.

A still further object of the present invention is to increase the speed at which corn is harvested by a combine without reducing the corn recovery rate.

Yet another object of the present invention is to prevent crop residue from accumulating in a combine corn head during harvesting by improving the manner in which the corn stalks are separated from an ear of corn, are reduced to small pieces of vegetation, and are discharged form the combine.

Still another object of the prevent invention is to improve and facilitate the recovery of corn from down corn stalks lying on the ground during harvesting.

It is another object of the present invention to provide a corn head for use in a combine in the harvesting of corn which is easily adjusted to accommodate the processing of corn stalks having a wide range of diameters and conditions.

The present invention contemplates a row unit for use in a corn head attached to a combine and having the combination of a first auger and elongated trough aligned generally transverse to the direction of travel of the combine, said row unit comprising: first and second cylindrical rotating stalk rolls laterally disposed in closely spaced relation to one another, wherein each stalk roll has an intake end for receiving corn stalks and an opposed outlet end and the stalk rolls rotate in opposite directions, and wherein each stalk roll includes plural cutting elements disposed on its outer surface in a spaced manner for reducing the corn stalks to small pieces, and wherein each stalk roll further includes outer fluting for displacing the corn stalks from the stalk roll's intake end toward its outlet end, and wherein the cutting elements and the auger urge the corn stalks downward in a space between said first and second stalk rolls; a stripper plate disposed above and in closely spaced relation to the first stalk roll and extending substantially the length of the first stalk roll from its intake end to its outlet end; a second auger disposed above and in closely spaced relation to the second stalk roll and extending substantially the length of the second stalk roll from its input end to its outlet end, wherein the second auger is further disposed in closely spaced relation to the stripper plate, and wherein the stripper plate removes ears of corn from the corn stalks and said auger displaces the thus removed ears of corn rearwardly to the first auger and trough combination.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 3a is a side elevation view of the arrangement of FIG. 3 illustrating additional details of the inventive corn head installation on a combine;

FIG. 5 is a plan view of the combination of an auger and a stripper plate for use in removing ears of corn from corn stalks in accordance with the present invention;

FIG. 5a is a simplified schematic diagram for changing the separation distance between the auger and stripper plate shown in FIG. 5 to accommodate corn stalks having a range of diameters;

FIG. 6 is a side elevation view of a skid plate disposed adjacent a pick-up cone for protecting the pick-up cone from impact damage and preventing vegetation from plugging of the corn head in accordance with another aspect of the present invention;

FIG. 7 is a front plan view of the mounting arrangement for the pick-up cone stripper plate shown in FIG. 6;

FIG. 8 is a simplified side plan view of another embodiment of a stripper plate for use with a pick-up cone in accordance with the present invention;

FIG. 8a is a transverse sectional view of the stripper plate of FIG. 8 showing additional details of the stripper plate mounting arrangement;

FIG. 9 is an end-on view of a pair of stalk rolls having plural spaced fluting members disposed thereon each having an integrated knife edge for reducing vegetation encountered by the stalk roll;

FIG. 10 is a side elevation view shown partially in phantom of one of the stalk rolls illustrated in FIG. 9;

DETAILED DESCRIPTION OF THE PREFERRED EMBODIMENTS

Figure 1:
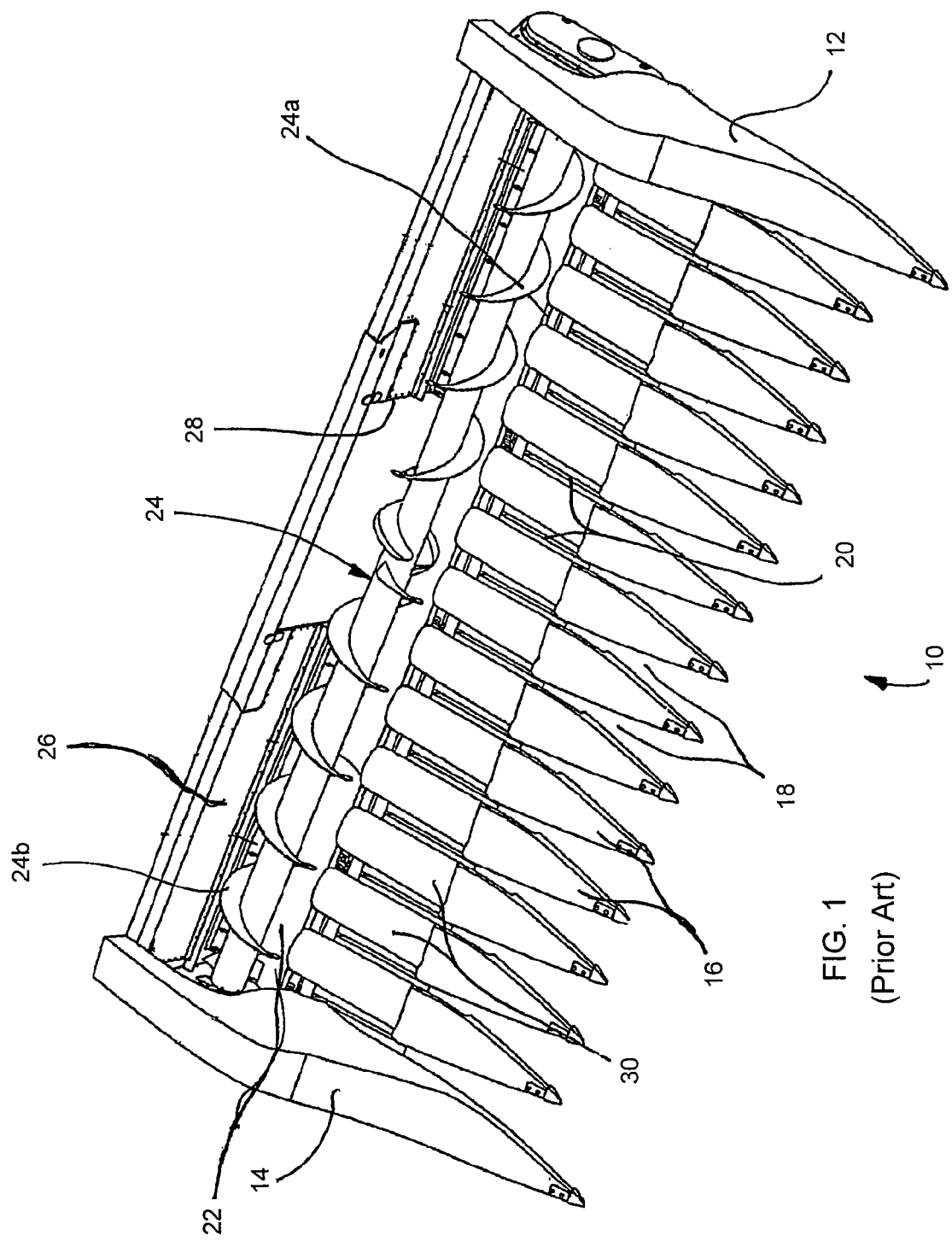
FIG. 1 is an upper perspective view of a conventional corn head adapted for mounting to a forward portion of a combine as currently used in the harvesting of corn.
Figure 2:
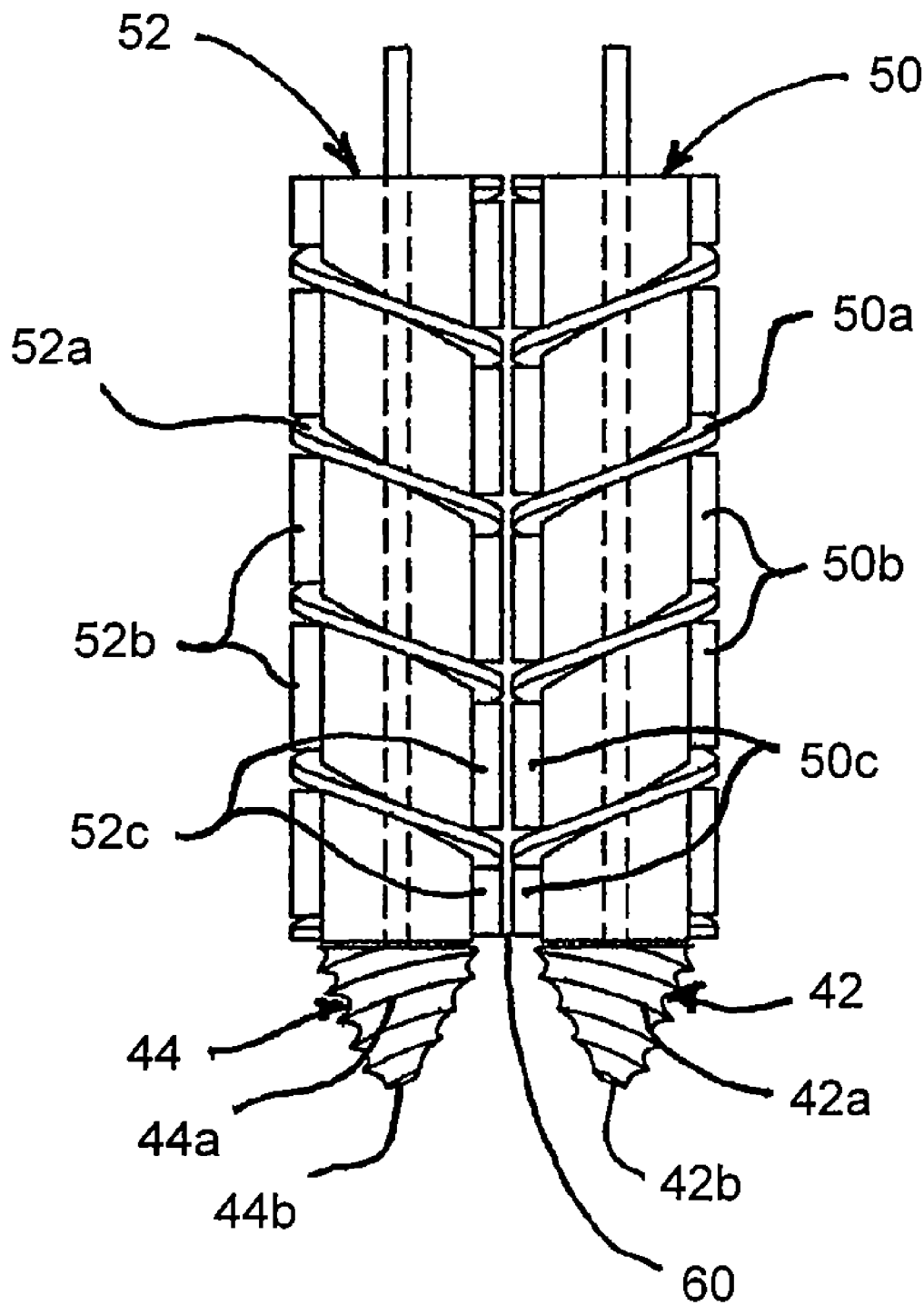
FIG. 2 is a top plan view of a pair of rotating stalk rolls and pick-up cones intended for use in a row unit of a corn head in accordance with the principles of the present invention.
Figure 3:
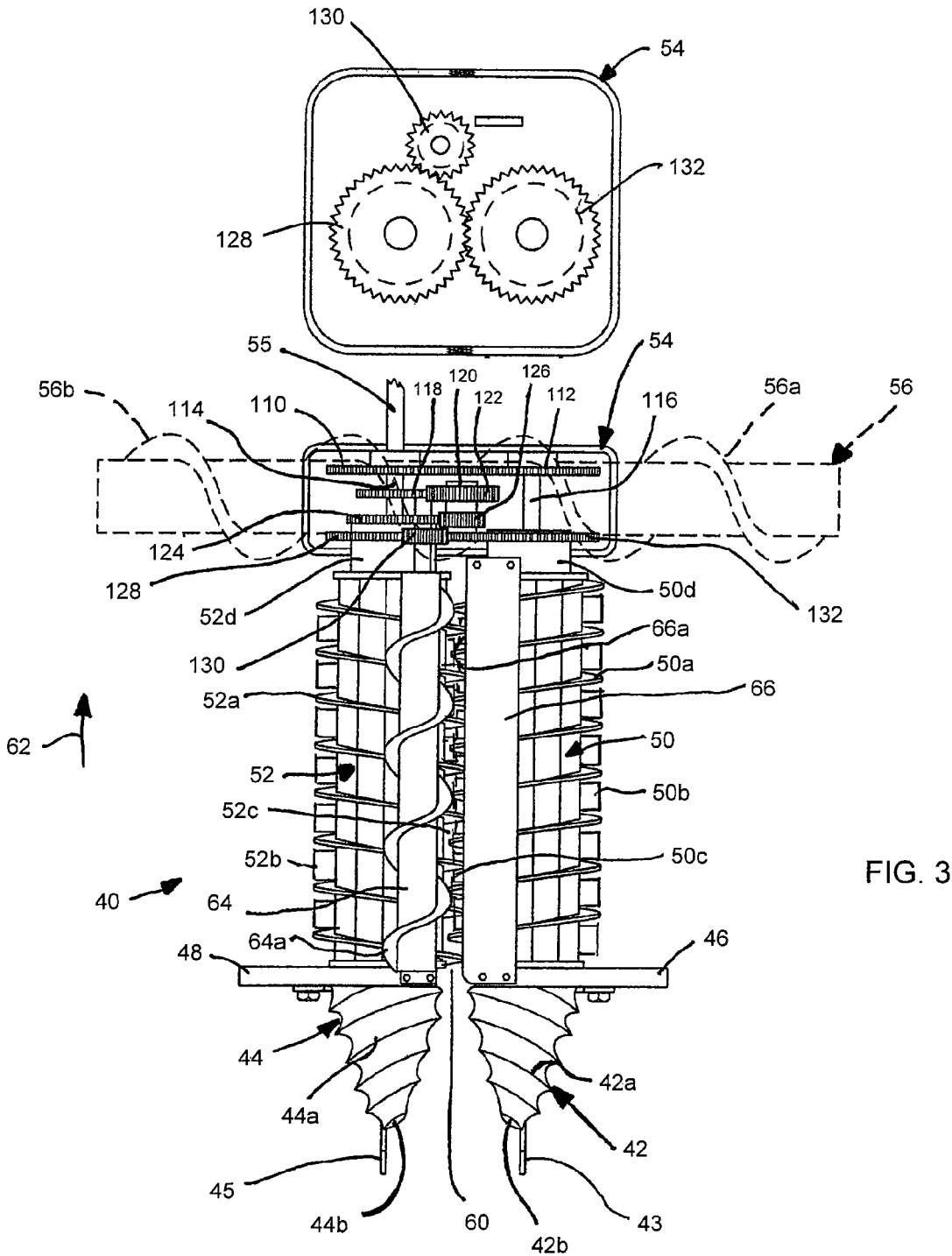
FIG. 3 is a top plan view of the pair of rotating stalk rolls shown in FIG. 2 which further illustrates the combination of an auger and a stripper plate in accordance with the present invention.

Referring to FIG. 2, there is shown a top plan view of a row unit 40 incorporating left and right pick-up cones 42 and 44 and left and right stalk rolls 50 and 52 in accordance with the present invention. FIG. 3 is a top plan view of the aforementioned combination of pick-up cones and stalk rolls as well as an auger 64 and a stripper plate 66, also in accordance with the present invention. FIG. 3a is a side elevation of the arrangement of FIG. 3 illustrating additional details of the inventive corn head installation on a combine.

The left and right pick-up cones 42, 44 include respective outer fluting 42a and 44a as well as respective generally pointed end portions 42b and 44b oriented in the direction of travel of the combine. The first and second pick-up cones 42, 44 are adapted for engaging and lifting corn stalks lying on the ground and directing these corn stalks into the combination of the first and second stalk rolls 50 and 52. The left and right pick-up cones 42, 44 are coupled to and supported by left and right structural support members 46 and 48, respectively, which form a part of row unit 40. Left and right pick-up cones 42, 44 rotate in opposite directions so as to direct ingested corn stalks in the space between the two pick-up cones in an upward direction, as well as in aft direction (or upward as shown in FIG. 3), toward the space 60 between upper, adjacent portions of the left and right stalk rolls 50, 52. As shown in the side elevation view of FIG. 3a, the combination of the left pick-up cone 42 and the left stalk roll 50 as well as the right pick-up cone 44 and the right stalk roll 52 (although the latter two elements are not shown in the figure) are disposed below the combination of a row divider 75 and a row crop cover 70 in the corn head. The combination of an auger 64 and a stripper plate 66, described in detail below, are also disposed beneath the row divider 75 and the row crop cover 70. The ears of corn separated from the corn stalks are provided to the combine transverse auger 56 for delivery to subsequent processing stages 69 in the combine.

The left and right stalk rolls 50, 52 are provided with respective fluting 50a, and 50b extending the length of the stalk rolls and configured to move cornstalks in a rearward direction within the row unit 40. The left and right stalk rolls 50, 52 also rotate in opposite directions so as to direct corn stalks to the space between the two stalk rolls and in a downward direction between the two rotating stalk rolls for discharge on the soil.

Also disposed on the outer surface of the left stalk roll 50 are first and second spaced linear arrays of knives 50b and 50c. The spaced linear arrays of knives 50b and 50c are disposed on opposed outer portions of the left stalk roll 50 and are positioned between adjacent portions of the outer fluting 50a on the left stalk roll. Right stalk roll 52 is similarly provided with fluting 52a and first and second arrays of spaced, aligned knives 52b and 52c which are disposed on opposed outer portions of the right stalk roll and extend the length of the stalk roll. The respective aligned arrays of knives 50b, 50c and 52b, 52c of the left and right stalk rows 50, 52 reduce the ingested corn stalks to small pieces of vegetation and direct the reduced vegetation toward the space between the two stalk rollers for discharge downward from the corn head 40. Left and right structural/support members 46, 48 are respectively coupled to and provide support for the forward portions of the left and right stalk rolls 50, 52. In addition, attached to respective forward portions of the left and right structural support members 46, 48 are left and right skid plates 43 and 45 disposed adjacent the left and right pick-up cones 42 and 44. The configuration and operation of skid plates 43 and 45 is described in detail below.

Row unit 40 further includes the combination of an auger 64 and a stripper plate 66 in accordance with the present invention. Auger 64 is provided with outer fluting 64a along the length thereof, while stripper plate 66 is provided with a cutting edge 66a extending the length thereof and in facing relation to the auger. The combination of rotating auger 64 and stripper plate 66 functions to remove by cutting action an ear of corn from each corn stalk and to move the thus severed ears of corn rearwardly toward a transverse trough within which is disposed combine auger 56.

Figure 4:
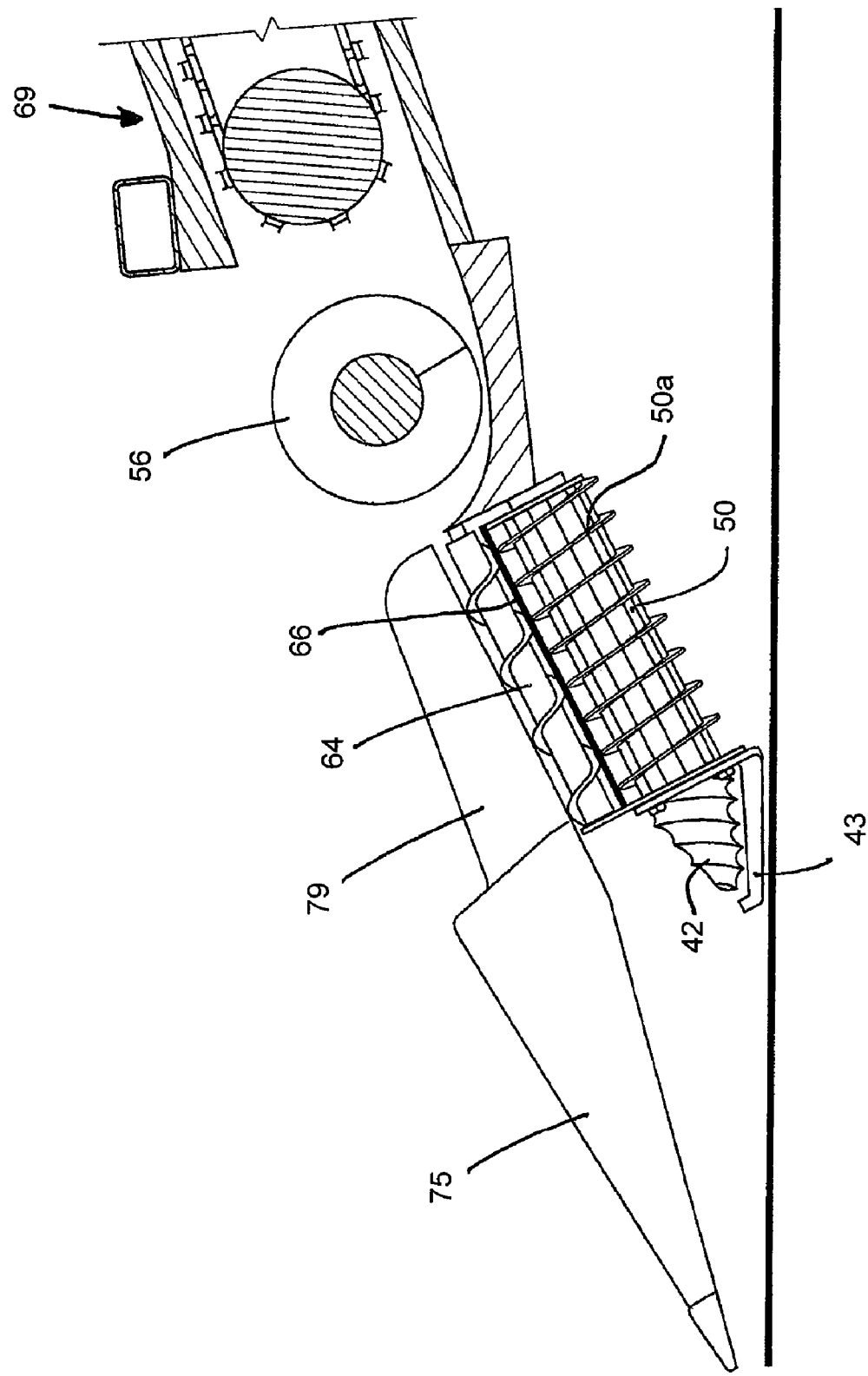
FIG. 4 is a front plan view of the gear arrangement in the gear box shown in FIG. 3 used for driving the stalk roll and pick-up cone combinations of the present invention.

Row unit 40 also includes a gear box 54 containing plural inter-connected gears for converting the rotational displacement of an input shaft 55 to a rotational motion of the left pick-up cone 42 and left stalk roll 50, as well as the right pick-up cone 44 and the right stalk roll 52, and the upper auger 64. A top view of the gears within the gear box 54 is shown in FIG. 3, and a front plan view of the gears within the gear box is shown FIG. 4.

Input shaft 55 is rotated by the combine and is coupled to and rotates a first gear 110 and is further connected to and continuous with a first inner drive shaft in 114. The first inner drive shaft 114 is coupled to and rotates the right pick-up cone 44. First gear 110 is further coupled to and rotationally displaces a second gear 112 which is coupled to a second inner drive shaft 116. The second inner drive shaft 116 is coupled to and rotates the left pick-up cone 42. The coupling between the first gear 110 and the second gear 112 is such that the first and second gears rotate in opposite directions, as do the first and second inner drive shafts 114, 116 which rotationally drive the left and right pick-up cones 42, 44 in opposite directions. A third gear 118 attached to input shaft 55 is coupled to a fourth gear 122 which is positioned on a coupling shaft 120. Similarly, a fifth gear 124 is positioned on the first inner drive shaft 114 and is coupled to a sixth gear 126 also disposed on coupling shaft 120. The rotational output of the third through sixth gears 118-126 is provided to the combination of a seventh gear 128, an eighth gear 130 and a ninth gear 132. Seventh gear 128 is coupled to an enlarged input drive shaft 52*d* of the right stalk roll 52. Similarly, ninth gear 132 is connected to an enlarged input drive shaft 50*d* of the left stalk roll 50. The manner in which the seventh and ninth gears 128, 132 are coupled together provides opposite directions of rotation for the left and right stalk rolls 50, 52. Eighth gear 130 is coupled to upper auger 64 for urging ears of corn separated from corn stalks rearwardly toward the combination of trough 68 and transverse auger 56 described earlier.

Referring to FIG. 5, there are shown an upper plan view of the combination of auger 54 and the stripper plate 66 and the arrangement for moving the stripper plate relative to the auger so as to adjust the space between these two components to accommodate corn stalks having a range of diameters. Additional details of the position adjusting arrangement for the stripper plate 66 are shown in FIG. 5*a*. As shown in FIG. 5, auger 64 is provided with outer fluting 64*a* for engaging and displacing ears of corn as described above and a drive gear 90 for rotationally displacing the auger. Stripper plate 66 is provided with an inner knife edge 66*a* and is attached to and supported by first and second support arms 92*a* and 92*b*. First and second support arms 92*a*, 92*b* are respectively coupled by means of first and second coupling brackets 94*a* and 94*b* to a rotatable six-sided, or hex, shaft 96. Hex shaft 96 is connected by means of a coupling bracket 102 to a distal end of an extendible rod 98*a* of a hydraulic cylinder 98 as shown in FIG. 5*a*. The opposing end of a hydraulic cylinder 98 is fixedly attached to a structural support member 100 of the corn head. Connected to the hydraulic cylinder 98 are first and second hydraulic lines 104*a* and 104*b* which, in turn, are connected to a hydraulic pressure source/reservoir 106. Hydraulic fluid provided under pressure to cylinder 98 via line 104*b* extends its rod 98*a*, while hydraulic fluid under pressure provided to the cylinder via hydraulic line 104*a* retracts the hydraulic cylinder rod. Extension and retraction of the hydraulic cylinder's rod 98*a* causes rotational displacement of hex shaft 96 about its longitudinal axis and relative displacement between stripper plate 66 and auger 64. It is in this manner that the space between stripper plate 66 and auger 64 may be varied to accommodate corn stalks having different diameters.

Referring to FIGS. 6 and 7, there are respectively shown side and front elevation views of a pick-up cone 70 attached to a combine traveling in the direction of arrow 76 and having a skid plate 72 disposed in closely spaced relation thereto in accordance with another aspect of the present invention. As in the previously described embodiments, rotating pick-up cone 70 is provided with outer fluting 70*a* and is rotationally driven by means of a rotating shaft 74 to which it is connected. Rotating shaft 74 extends through an aperture within a structural support member 78 within the corn head. Attached to the structural support member 78 is the skid plate 72. Skid plate 72 is preferably comprised of a unitary structure and includes a forward section 72*a*, a lower section 72*b* and an aft section 72*c*. The forward section 72*a* of skid plate 72 covers the forward, pointed portion 70*b* of the pick-up cone 70, while the skid plate's lower section 72*b* covers the lower portion of the pick-up cone. The skid plate's aft section 72*c* is provided with a pair of apertures and is adapted for mounting to the structural support member 78 within the row unit by means of the combination of a first bolt 80*a* and first nut 82*a* and a second bolt 80*b* and a second nut 82*b*. Each of the apertures 84 and 86 within the structural support member 78 is vertically elongated so as to allow for changing the spacing between pick-up cone 70 and the skid plate's lower section 72*b* as shown by the dotted lines in FIG. 6. Skid plate 72 functions to protect pick-up cone 70 from damage or destruction caused by impact with the ground or with an object in the field such as a rock. Skid plate 72 also prevents weeds and other vegetation on the surface of the soil, including wet corn stalks, from clogging the pick-up cone 70 as well as its associated stalk roll disposed aft of the pick-up cone.

Referring to FIG. 8, there is shown a side plan view of another embodiment of a skid plate installation 136 in accordance with the present invention. Skid plate installation 136 connects a generally elongated, angled skid plate 138 to first and second structural support members 140 and 144. The first and second structural support members 140, 144 are shown in FIG. 8 as being two separate members, but could equally as well be different portions of the same structural support member. Skid plate 138 includes a forward section 138*a*, a lower section 138*b* and an aft section 138*c*. The forward section 138*a* of skid plate 138 is disposed adjacent the leading, pointed end portion of a pick-up cone which is not shown in the figure for simplicity. The lower section 138*b* of skid plate 138 is disposed adjacent a lower, forward portion of the rotating pick-up cone. The aft section 138*c* of skid plate 138 is coupled by means of a nut and bolt combination 142 to the first structural support member 140. The skid plate's aft section 138*c* is further coupled to the second structural support section 144 by means of a U-bolt installation 146. A sectional view of the skid plate installation 136 is shown in FIG. 8*a* and illustrates additional details of the coupling of the skid plate 138 to the second structural support member 144. The second structural support member 144 is provided with a pair of apertures, each adapted to receive a respective linear portion of U-bolt 147. First and second nuts 148*a* and 148*b* are used to attach the U-bolt 147 to the second structural support member 144. Skid plate 138 is disposed between a lower surface of the second support member 144 and the curved portion of U-bolt 147, with space provided between the skid plate and the curved portion of the U-bolt to allow the skid plate to be displaced in the directions of arrow 150 upon impact with an obstruction in the filed. Allowing the skid plate 138 to be deflected in a vertical direction upon impact with an obstruction allows the impact force to be transferred via the skid plate to the structure of the corn head thus increasing the operating lifetime of the skid plate.

Referring to FIG. 9, there is shown a pair of stalk rolls 160 and 162 incorporating plural spaced fluting members thereon in accordance with another embodiment of the present invention. The first stalk roll 160 rotates in the direction of arrow 166, while the second stalk roll 162 rotates in a second, opposed direction shown by direction arrow 168. Disposed adjacent lower portions of the first and second stalk rolls 160, 162 are respective first and second weed strippers 170 and 172 which remove excess vegetation from the stalk rolls and prevent clogging of the stalk rolls as described above.

FIG. 10 is a side elevation view of the first stalk roll 160 shown partially in phantom. The following discussion is limited to the first stalk roll 160, as the second stalk roll 162 is the same as the first stalk roll in configuration and operation. First stalk roll 160 includes an elongated, generally cylindrical inner shaft 164 having plural spaced fluting members disposed about its outer periphery and extending the length thereof. It is by means of these fluting members that the rotating stalk roll 160 displaces ingested vegetation in the direction of arrow 174 toward the combine feeder house (not shown for simplicity). First, second, third and fourth fluting members 176, 178, 180 and 182 are shown in FIGS. 9 and 10. Additional fluting members are disposed along the remaining length of the first stalk roll 160 as shown in FIG. 10, but only the four aforementioned fluting members are visible in the end-on view of the first stalk roll shown in FIG. 9 and only the four aforementioned fluting members are described in detail herein. Each fluting member extends outwardly from the stalk roll's inner shaft 164 in proceeding from a first end to a second, upraised end which includes a cutting knife edge. Thus, first fluting member 176 terminates in a first cutting knife edge 176a. Similarly, second, third and fourth fluting members 178, 180 and 182 respectively terminate in second, third and fourth cutting knife edges 178a, 180a and 182b. The upraised, flat cutting knife edges 176a-182a of each of these fluting members sever the ingested vegetation to small particle size to facilitate discharge of the thus reduced vegetation to the soil. In addition, the flat portions of each of the of the four cutting knife edges 176a-182a facilitate displacement of the vegetation about each of the first and second stalk rolls 160, 162 to the space located between the stalk rolls for discharge from the stalk rolls onto the soil. The configuration of the first through fourth fluting members 176-182 thus allows the rotating stalk rolls 160, 162 to ingest additional amounts of vegetation without clogging or delaying the separation of the ears of corn from the corn stalks.

Figure 11:
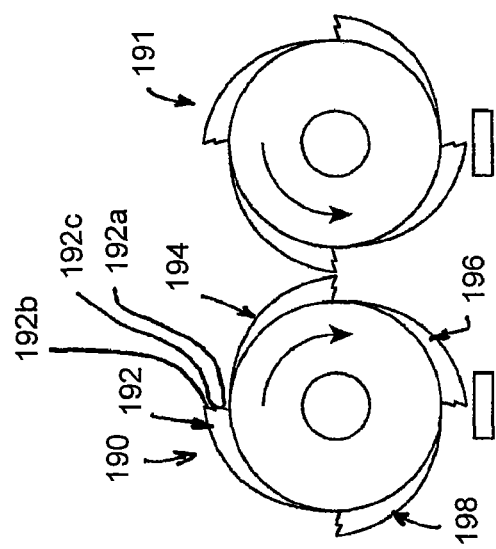
FIG. 11 is an end-on view of a pair of stalk rolls incorporating plural spaced fluting members having coined edge portions thereon in accordance with another embodiment of the present invention.
Figure 12:
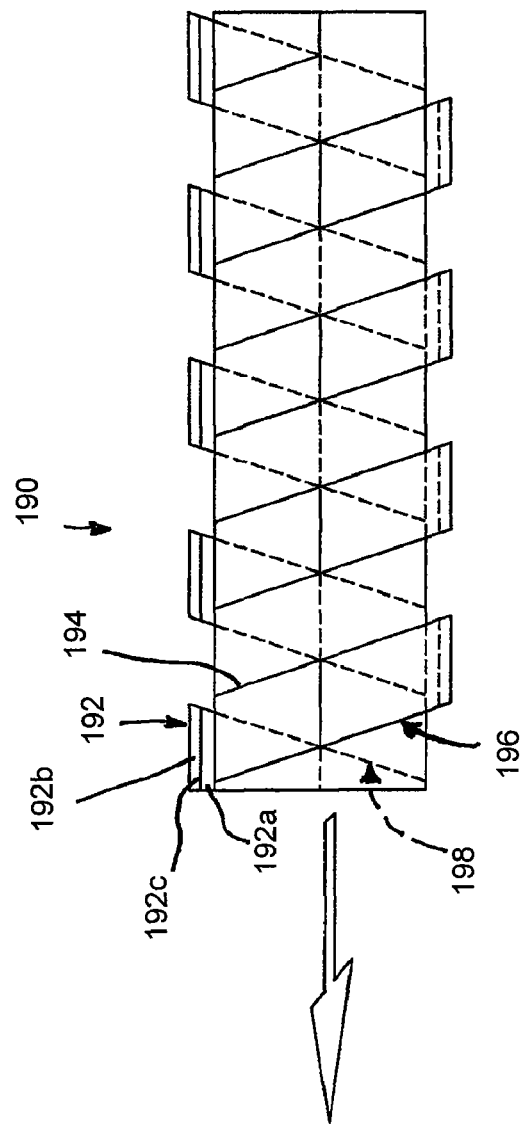
FIG. 12 is a side elevation view of one of the stalk rolls illustrated in FIG. 11.

Referring to FIG. 11, there is an end-on view of yet another embodiment of a pair of stalk rolls 190, 191 in accordance with the principles of the present invention. Stalk rolls 190, 191 differ from stalk rolls 160 and 162 shown in FIG. 9 only in the cutting edge portions of their fluting members and stalk rolls 190 and 191 are identical in configuration and operation. Therefore, only the cutting edge portions of stalk roll 190 are described in detail. In the embodiment shown in FIG. 11 and FIG. 12, wherein stalk roll 160 is viewed from the space between the two stalk rolls as viewed in FIG. 11, stalk roll 190 is provided with four fluting members 192, 194, 196 and 198 equally spaced around its outer periphery. The configuration and operation of each of these four fluting members will be described in terms of the first fluting member 192, as all of these fluting members are configured and operate similarly. First fluting member 192 includes a first inner section 192a and a second outer section 192b. Disposed between and connecting the first inner section 192a and the second outer section 192b is a third intermediate section 192c. The third intermediate section 192 is generally transverse to the first inner and second outer sections 192a and 192b. This offset spacing of the first inner and second outer sections 192a, 192b provides the first fluting member 192 with a step configuration which enhances the engagement of the fluting members on the rotating stalk roll with the ingested vegetation so as to facilitate rearward movement of the vegetation toward the combine feeder house and discharge of the reduced vegetation through the inter-stalk roll space. While each of the fluting members 192-198 is described in terms of a first inner section, a second outer section and a third intermediate section, each of the fluting members is preferably comprised of a unitary structure formed of a single piece of high strength coined metal and is tapered in proceeding from its coined edge portion rearwardly toward the combine feeder house as in the previously described embodiments. While the embodiments shown in FIGS. 9 and 10 and FIGS. 11 and 12 include plural, spaced fluting members disposed about the outer portion and extending the length of the stalk roll, the present invention is not limited to this configuration. The present invention also contemplates plural fluting members disposed about the outer portion of the stalk roll, with each of the circumferentially spaced fluting members also extending the full length of the stalk roll and not arranged in the form of plural spaced fluting members disposed along the length of the stalk roll.

While particular embodiments of the present invention have been described, it would be obvious to those skilled in the relevant arts that changes and modifications may be made without departing from the invention in its broader aspects. Therefore, the aim in the appended claims is to cover all such changes and modifications that fall within the true spirit and scope of the invention. The matters set forth in the foregoing description and accompanying drawings are offered by way of illustration only and not as a limitation. The actual scope of the invention is intended to be defined by the following claims when viewed in their proper perspective based on the prior art.

I claim:

1. A row unit for use in a corn head attached to a combine having the combination of a first auger and elongated trough aligned generally transverse to the direction of travel of the combine, said row unit comprising:

first and second cylindrical rotating stalk rolls laterally disposed in closely spaced relation to one another, wherein each stalk roll has an intake end for receiving corn stalks and an opposed outlet end and said stalk rolls rotate in opposite directions, and wherein each stalk roll includes plural cutting elements disposed on its outer surface in a spaced manner for reducing the corn stalks to small pieces, and wherein each stalk roll further includes a respective first outer fluting for displacing the corn stalks from the stalk roll's intake end toward its outlet end, and wherein said cutting elements and said stalk rolls urge the corn stalks downward in a space between said first and second stalk rolls;

first and second rotating pick-up cones respectively disposed forward of and in closely spaced relation to said first and second stalk rolls for engaging and lifting corn stalks lying on the ground and providing these down corn stalks to said first and second stalk rolls, wherein each of said first and second rotating pick-up cones includes a respective second outer fluting;

a stripper plate disposed above and in closely spaced relation to said first stalk roll and extending substantially the length of said first stalk roll from its intake end to its outlet end; and a second auger disposed above and in closely spaced relation to said second stalk roll and extending substantially the length of said second stalk roll from its input end to its outlet end, wherein said second auger is further disposed in closely spaced relation to said stripper plate, and wherein said stripper plate removes ears of corn from the corn stalks and said second auger displaces the thus removed ears of corn rearwardly to the first auger and trough combination.

2. The row unit of claim 1 further comprising an adjustable positioning mechanism coupled to said stripper plate for changing the spacing between said stripper plate and said second auger for accommodating ears of corn of different diameters.

3. The row unit of claim 2, wherein said adjustable positioning mechanism includes a hydraulic cylinder coupled to said stripper plate.

4. The row unit of claim 3, wherein said adjustable positioning mechanism further includes a shaft coupled to said stripper plate and to said hydraulic cylinder and rotatable by said hydraulic cylinder for rotationally displacing said stripper plate away from or toward said second auger.

5. The row unit of claim 1 further comprising a drive mechanism for rotationally displacing said first and second stalk rolls and said second auger.

6. The row unit of claim 5, wherein said drive mechanism includes a gear box.

7. The row unit of claim 1, wherein each of said first and second pick-up cones is tapered outwardly in proceeding from front to rear and rotates about an axis generally aligned with an axis of rotation of its associated stalk roll.

8. The row unit of claim 7, wherein each of said first and second pick-up cones rotate in opposite directions and also rotate in a direction opposite to the direction of rotation of its associated stalk roll.

9. The row unit of claim 8 further comprising a drive mechanism for rotationally displacing said first and second stalk rolls, said first and second pick-up cones and said second auger.

10. The row unit of claim 1 further comprising first and second skid plates respectively disposed in closely spaced relation to said first and second pick-up cones for protecting said pick-up cones from impact damage and preventing clogging of the pick-up cones and their associated stalk rolls by vegetation.

11. The row unit of claim 10, wherein each skid plate is disposed adjacent a lower, forward portion of an associated pick-up cone.

12. The row unit of claim 11, wherein each pick-up cone includes a respective forwardly directed, pointed portion, and wherein each skid plate is further disposed adjacent the pointed portion of its associated pick-up cone.

13. The row unit of claim 12 further comprising a mounting mechanism for positioning each of said skid plates adjacent an associated pick-up cone in an adjustable manner for allowing for changing the spacing between a skid plate and its associated pick-up cone.

14. The row unit of claim 1, wherein the outer fluting disposed on each of said first and second stalk rolls includes a first inner section and a second outer section extending radially outwardly from the stalk roll in an offset manner to facilitate displacing the corn stalks from the stalk roll's intake toward its outlet end and downward in the space between the stalk rolls.

15. A row unit for use in a corn head attached to a combine having the combination of a first auger and elongated trough aligned generally transverse to the direction of travel of the combine, said row unit comprising:

first and second cylindrical rotating stalk rolls laterally disposed in closely spaced relation to one another, wherein each stalk roll has an intake end for receiving corn stalks and an opposed outlet end and said stalk rolls rotate in opposite directions, and wherein each stalk roll includes plural cutting elements disposed on its outer surface in a spaced manner for reducing the corn stalks to small pieces, and wherein each stalk roll further includes a respective first outer fluting for displacing the corn stalks from the stalk roll's intake end toward its outlet end, and wherein said cutting elements and said stalk rolls urge the corn stalks downward in a space between said first and second stalk rolls;

a stripper plate disposed above and in closely spaced relation to said first stalk roll and extending substantially the length of said first stalk roll from its intake end to its outlet end;

a second auger disposed above and in closely spaced relation to said second stalk roll and extending substantially the length of said second stalk roll from its input end to its outlet end, wherein said second auger is further disposed in closely spaced relation to said stripper plate, and wherein said stripper plate removes ears of corn from the corn stalks and said second auger displaces the thus removed ears of corn rearwardly to the first auger and trough combination;

first and second rotating pick-up cones respectively disposed forward of and in closely space relation to said first and second stalk rolls for engaging and lifting corn stalks lying on the ground and providing these down corn stalks to said first and second stalk rolls, wherein each of said first and second rotating pick-up cones includes respective second outer fluting and is tapered outwardly in proceeding from front to rear and rotates about an axis generally aligned with an axis of rotation of its associated stalk roll, and wherein each of said first and second pick-up cones rotate in opposite directions and also rotate in a direction opposite to the direction of rotation of its associated stalk roll; and a drive mechanism for rotationally displacing said first and second stalk rolls, said first and second pick-up cones and said second auger, wherein said drive mechanism includes a gear box having gears and first and second coaxial drive shafts respectively coupling said first stalk roll and said first pick-up cone to gears in said gear box and third and fourth coaxial drive shafts respectively coupling said second stalk roll and said second pick-up cone to gears in said gear box for rotating said first stalk roll and said first pick-up cones in opposite directions and said second stalk roll and said second pick-up cone in opposite directions.

16. The row unit of claim 15, wherein the outer fluting of said first and second pick-up cones are arranged in opposite directions.

17. A row unit for use in a corn head attached to a combine having the combination of a first auger and elongated trough aligned generally transverse to the direction of travel of the combine, said row unit comprising:

first and second cylindrical rotating stalk rolls laterally disposed in closely spaced relation to one another, wherein each stalk roll has an intake end for receiving corn stalks and an opposed outlet end and said stalk rolls rotate in opposite directions, and wherein each stalk roll includes plural spaced first fluting members disposed about the outer circumference and extending the length of each stalk roll, and wherein said first fluting members are configured and oriented to displace the corn stalks from the stalk roll's intake end toward its outlet end, and wherein each first fluting member extends outwardly from its associated stalk roll and terminates in an upraised end knife portion adapted to separate an ear of corn from its associated stalk and to reduce ingested vegetation to small pieces;

first and second rotating pick-up cones respectively dispose forward of and in closely spaced relation to said first and second stalk rolls for engaging and lifting up corn stalks lying on the ground and providing these down corn stalks to said first and second stalk rolls, wherein each of said first and second rotating pick-up cones includes a respective second outer fluting; and first and second stripper plates respectively disposed in closely spaced relation to lower portions of said first and second stalk rolls for removing ingested vegetation from and preventing clogging of said stalk rolls.

18. The row unit of claim 17, wherein each end knife portion of a fluting member is formed by an outer side portion and a generally flat end portion of the fluting member.

19. The row unit of claim 18, wherein said plural spaced fluting members are disposed in a spiral array about each of said first and second stalk rolls.

20. The row unit of claim 17, wherein each of said fluting members is in the form of a single piece of high strength metal.

21. The row unit of claim 17, wherein the upraised end knife portion of each fluting member includes a first inner section extending outwardly from a cylindrical portion of the stalk roll and a second outer section extending outwardly from said first inner section, and wherein said first inner and second outer sections are offset from one another and provide said upraised end knife portion with a step configuration.

22. The row unit of claim 21 further comprising a third intermediate section disposed between and continuous with said first inner and second outer end knife sections, and wherein said third intermediate section is aligned generally transverse to said first inner and second outer sections.

23. The row unit of claim 22, wherein said first inner, said second outer and said third intermediate sections are coined sections.

* * * * *